March 1, 1960 R. WEISS 2,926,572
PROTECTIVE HOUSING FOR PHOTOGRAPHIC CAMERAS
Filed June 29, 1954 3 Sheets-Sheet 1

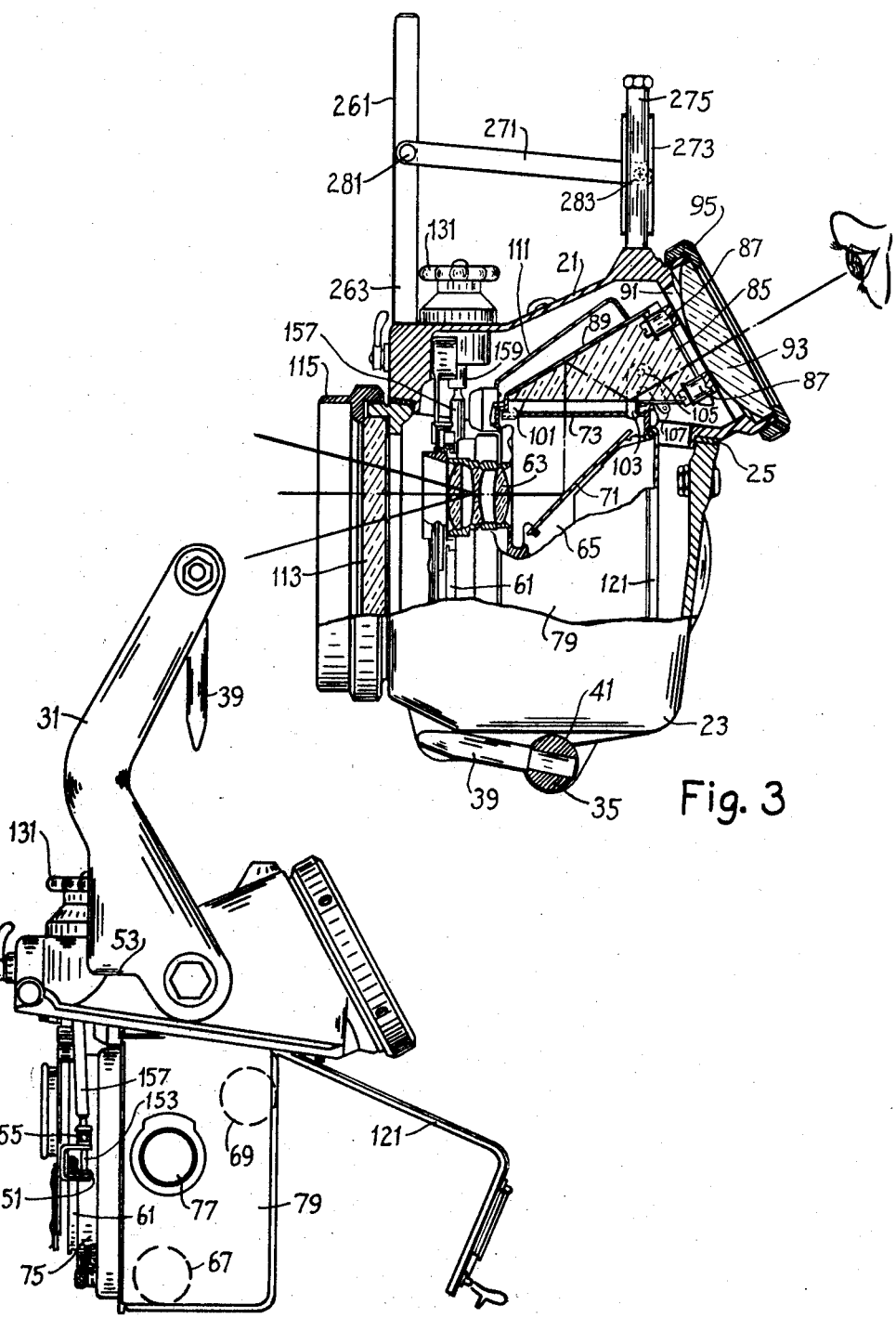

United States Patent Office 2,926,572
Patented Mar. 1, 1960

2,926,572

PROTECTIVE HOUSING FOR PHOTOGRAPHIC CAMERAS

Richard Weiss, Braunschweig, Germany, assignor to Franke & Heidecke, Fabrik Photographischer Präzisions-Apparate, Braunschweig, Germany, a German firm Application June 29, 1954, Serial No. 440,198

Claims priority, application Germany July 1, 1953

6 Claims. (Cl. 95—11)

This invention relates to a protective housing for enclosing a photographic camera, and especially a watertight housing for enclosing a roll film camera in such manner that underwater pictures may be taken by a swimmer carrying the housing with a camera enclosed therein.

An object of the invention is the provision of generally improved and more satisfactory equipment of this kind.

Another object is the provision of a housing so designed and constructed that the camera may be placed and secured therein with a minimum of effort, and so that the housing may be opened easily and quickly to a sufficient extent to permit the removal of an exposed roll of film and substitution of a fresh roll of film.

Still another object is the provision of a housing especially designed for a roll film camera of the twin lens reflex type in which viewing is normally accomplished by looking downwardly onto a focusing screen at the top of the camera, the housing having special provision whereby the focusing image may be seen by the swimmer when looking obliquely forwardly rather than directly downwardly, so that the swimmer may attend to focusing of the camera or at least observe the image on the focusing screen within his field or forward view while swimming forwardly.

A further object is the provision of a housing so designed and constructed that it may be used with a commercial form of roll film camera without any change whatever in most of the features of the camera and with only a minimum change in a few parts of the camera which can easily be changed.

A still further object is the provision of a housing having externally accessible controls for operating the various parts of the camera, which controls are easily connected operatively to the corresponding parts of the camera itself upon insertion of the camera into the housing, and are easily disconnected upon removal of the camera from the housing, without requiring any tools or any changes whatever in the normal operating parts of the camera, such as the parts for winding film, tensioning the shutter, adjusting the shutter speed, adjusting the diaphragm, and focusing.

These and other desirable objects may be attained in the manner disclosed as an illustrative embodiment of the invention in the following description and in the accompanying drawings forming a part hereof, in which:

Fig. 3 is a view partly in side elevation and mainly in central vertical section through the construction shown in Fig. 1; and Fig. 4 is a side elevation of the parts with the lower portion of the housing completely removed, showing the camera supported from the top portion of the housing and showing the back or closure of the camera in open position for changing the roll of film.

Similar reference numerals throughout the several views indicate the same parts.

Figure 1:
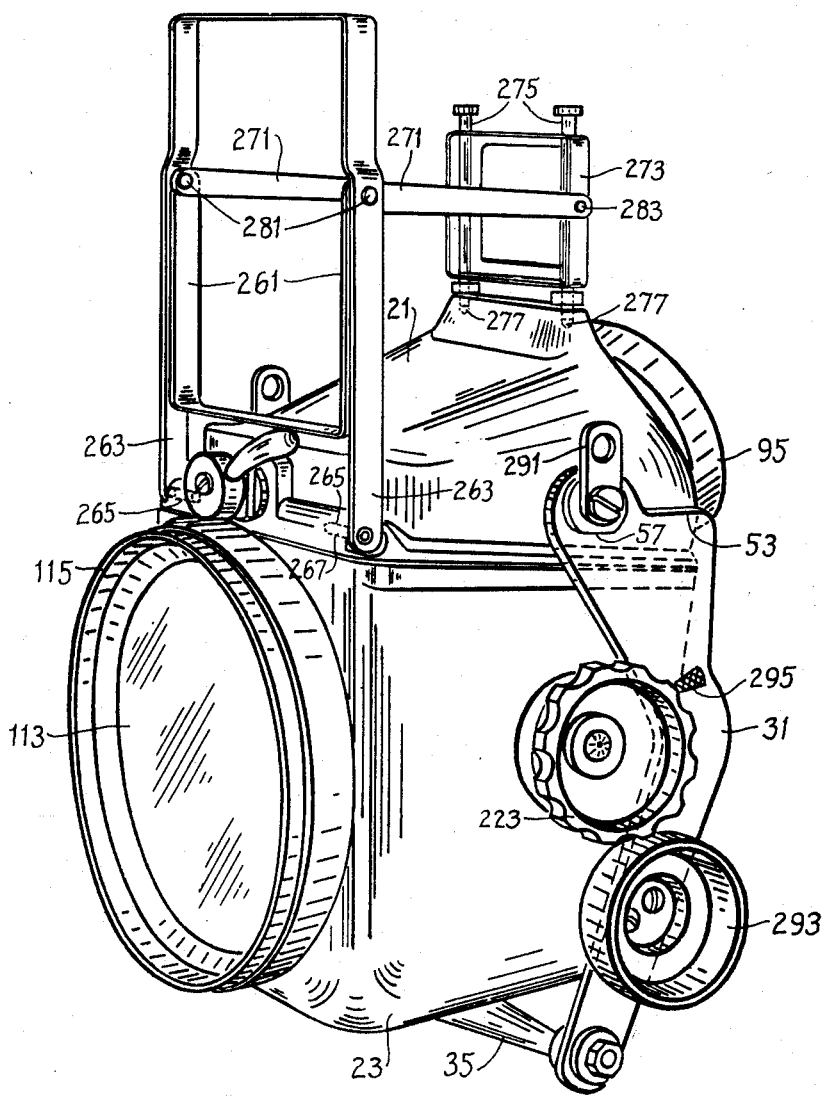
Fig. 1 is a perspective view of a housing in accordance with one embodiment of the invention, with the shutter speed and diaphragm aperture adjusting parts omitted for the sake of clarity, and with the supplementary direct view finder shown in place on the housing, the housing being viewed obliquely rearwardly from a point forward and to the left of the housing.

The housing of the present invention may, of course, be changed in various minor details to adapt it to use with various makes or models of photographic cameras. The details herein specifically disclosed as an exemplary embodiment of the invention are intended for use with a twin lens reflex camera of the kind known as the "Rolleiflex" camera manufactured for some years past by the firm of Franke & Heidecke in Germany, and widely known and used in the United States of America and other countries. Although the present invention relates to the housing for containing the camera, rather than to the camera itself, a knowledge of the construction of the camera is desirable in order that one may understand how the camera within the housing is operated and adjusted from the various controls externally accessible on the housing. The present disclosure presupposes that the reader will have knowledge of the construction of the "Rolleiflex" camera. Those who are not already familiar with the camera are referred to the book "Rolleiflex Photography, Handbook of the Rolleiflex and Rolleicord cameras," by Jacob Deschin, published in 1952 by Camera Craft Publishing Company, San Francisco, California (192 pages), and to the pamphlet publication "Rolleiflex 2.8C in Practical Use," published in 1953 by Franke & Heidecke, the manufacturers of the camera, a copy of which pamphlet publication is believed to be available in the Scientific Library of the U.S. Patent Office.

The problems connected with satisfactory underwater photography by swimmers using small hand cameras are not easy of solution. A watertight supplementary casing or housing is, of course, necessary to contain the camera. When using a high grade camera as distinguished from an inexpensive box camera, it is necessary to provide external manipulating means, not only for winding the film and operating the shutter, but also for adjusting the shutter speed, adjusting the diaphragm aperture, and preferably also for changing filters, if one is to take advantage of the maximum possibilities of a high grade camera. In addition, if the camera happens to be of the reflex focusing type, it is desirable to provide some means whereby the swimmer may see the focusing screen within his range of vision while he is looking forwardly in the direction in which he swims. This cannot be done without special provision, because in the ordinary reflex focusing camera, the focusing screen is arranged horizontally at the top of the camera, and in the absence of some special provision the swimmer would have to look downwardly onto the focusing screen to see what is within the field of view of his camera, and then would have to shift his head to look forwardly to see where he is swimming. But the present invention takes care even of this matter, requiring only a slight shift of the eyes of the swimmer from the forward direction in which he is swimming to an obliquely downward direction to see the view finder of the camera.

Referring now especially to the drawings, the housing of the present invention comprises in general an upper part 21 and a lower part 23 adapted to fit tightly together along a parting line provided with a sealing gasket 25. The parting line inclines slightly downwardly from front to rear, so as to pass above a front window in the front wall of the bottom housing section 23 and below a rear window at the back of the upper housing section 21, as seen especially in Fig. 3. These windows will be described in greater detail below.

When the two parts of the housing are in closed position relative to each other, they are held tightly against each other, to make a watertight joint at the gasket 25, by means of a stirrup or bail comprising side arms 31 pivoted to the upper housing section on the pivots 33 and having a cross bar 35 extending between the two side arms 31 at their extreme outer or free ends, the cross bar 35 being rotatable in the arms 31 in journals or bearings which are eccentric with respect to a portion of the cross bar at the center line of the housing, as indicated at 37. A short handle 39 is attached to the cross bar 35 near the center thereof, and serves to turn the same relative to its supporting arms 31.

A longitudinal rib formed on the bottom of the lower housing section 23 is provided with an arcuate depression 41 which forms a seat or socket for receiving the cross bar 35 when the housing is in closed position. To close the housing in a watertight manner, the bail or stirrup comprising the parts 31 and 35 is swung downwardly from the position shown in Fig. 3 to the position shown in Fig. 1, until the cross bar 35 of the bail lies opposite the notch or recess 41 in the lower housing section. The handle 39 at this time points rearwardly and the eccentric 37 is in its released position, not pressing tightly into the recess 41. The handle 39 is then turned clockwise (when viewed as in Figs. 1 and 3) through approximately 180°, to swing it to the position shown in Fig. 3. This rotation of the cross bar 35 and its eccentric 37 tightens the eccentric firmly into the notch or recess 41 of the lower housing section 23, thus producing a strong upward pressure on the bottom of the housing section 23 and likewise pulling strongly downwardly (through the pivot 33) on the upper housing section 21, to compress the sealing gasket 25 firmly between these two sections to make a watertight joint.

When the eccentric 37 has thus been positioned in its effective locking position, the handle 39 lies in a longitudinal groove formed centrally in the bottom of the housing section 23, between two ribs 43 arranged on either side of such groove, this position being well seen in Fig. 3. The ribs 43 thus serve as adequate protection for the handle 39, guarding the handle against accidental contact with external objects.

Figure 2:
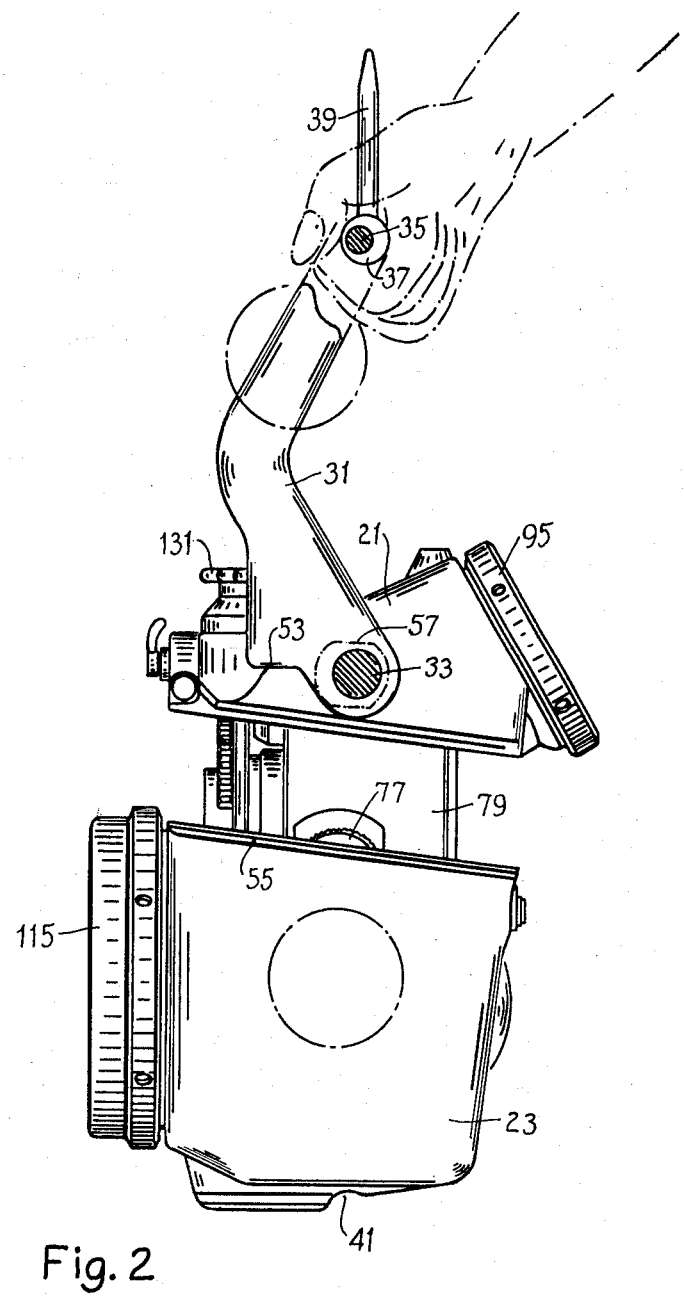
Fig. 2 is a side elevation of the housing and camera (but with certain parts omitted for clarity) showing the clamping bail or stirrup swung upwardly to its completely released position and showing the lower part of the housing partly separated from the upper part thereof, during opening or closing of the housing.

When the housing is to be opened, for changing the film or perhaps for complete removal of the camera from its protective housing, the handle 39 is turned counterclockwise (when viewed from the left as in Fig. 3), thereby releasing pressure of the eccentric 37 against the bottom of the lower housing section 2. Then the entire bail or stirrup 31, 35 is swung rearwardly and upwardly on its trunnions 33 to a position above the upper section 21 of the housing, as shown in Fig. 2, in which position the cross bar 35 forms a convenient handle to be grasped for supporting the upper part of the housing and lifting it upwardly off of the lower part of the housing. If the upper and lower housing sections 21 and 23 stick to each other, the bail may be swung further in a counterclockwise direction beyond the position shown in Fig. 2, whereupon shoulders 53 formed on both of the side arms 31 will swing around to engage and press downwardly on lateral flanges 55 formed at the top edge of the lower housing section 23, to separate the two housing sections forcibly from each other, with very little effort on the part of the operator.

To insure tight closing of the two housing sections against each other even after the parts have been used long enough to produce some wear, the trunnions 33 of the bail arms 31 are in the form of adjustable eccentrics. For example, these trunnions may be in the form of pins threaded laterally into the side walls of the housing section 21, and capable of being turned slightly by means of a wrench applied to flat spots 57 formed on the pins. The circular parts of the pins which form bearings for the arms 31 are offset eccentrically from the parts which are threaded into the walls of the housing.

In the preferred construction, for use with a twin lens reflex camera such as a "Rolleicord," the camera is preferably hung from its top and supported entirely from the upper section 21 of the housing, so that the bottom portion and side walls of the camera are freely accessible when the lower housing section 23 is dropped downwardly and removed, as in Fig. 4. As is well known by those familiar with these cameras, the front wall of the camera is provided with two lenses, a lower or picture taking lens the mount of which is indicated partially at 61, and an upper or finder lens indicated diagrammatically at 63. When a shutter (not shown) associated with the lower lens is opened, light enters the lower lens and passes into the exposure chamber 65, falling upon sensitized film which passes vertically across the rear part of the exposure chamber, from a film supply roll 67 to a film take-up or winding roll 69. Light entering the finder lens 63 passes rearwardly to a reflex mirror 71 where it is reflected upwardly to form an image on a viewing screen 73 (of ground glass, for example) extending horizontally across the top of the finder chamber, within and normally shadowed by an erectable and collapsible focusing hood. The general arrangement of the lenses and hood may be as shown, for example, in U.S. Patent 2,642,790 to Scholkemeier, while the construction of the hood itself may be similar to that shown in U.S. Patent 2,641,955 to Bretthauer. The upper and lower lenses of the camera are both mounted on a camera front member 75 which moves forwardly and backwardly for purposes of focusing, the focusing movements being controlled by a focusing knob 77 rotatably mounted on the left side wall of the main camera body 79.

As already intimated above, it is desirable, in a camera to be used by underwater swimmers, that the swimmer to be able to observe the view finder of the camera while looking approximately forwardly in the direction in which he is swimming, rather than having to shift his head through a substantial angle and look directly downwardly onto the top of the camera. For this purpose, the upper casing section 21 of the housing according to the present invention is provided with a roof prism 85 permanently mounted in this upper section by screw and mounting posts 87 which engage a metal frame 89 surrounding certain parts of the prism to hold it securely, these prism mounting posts 87 being around the edges of a finder viewing window 91 which is closed in watertight manner by a lens 93 held in place by a retaining ring 95 screwed onto an upstanding flange formed on the housing around the window opening. A suitable watertight gasket is provided.

It is desirable, as already mentioned, to suspend the camera from its top and to mount it from the upper section 21 of the housing, rather than the lower section 23. For this purpose, the metal frame 89 which holds the roof prism 85 is provided at its forward corners with two hook like projections 101 which extend downwardly and thence forwardly, through slots specially formed in the metal frame of the camera near the right and left front corners of the focusing screen 73. Near the right and left rear corners of the focusing screen, the metal frame is also provided with slots for engaging hooks 103 of latches which are pivoted at 105 to a stationary part of the housing 21 (for example, to the sides of the metal frame 89 which holds the roof prism) and which are spring pressed into latching position until released by finger pressure applied to the arms 107 of the latches 103. The only change necessary in the camera, to adapt it to use in the under-water housing of the present invention is the removal of the normal rear wall of the collapsible focusing hood. This is easily accomplished without damage to the camera, and the wall may be easily installed again when it is desired to use the camera once more in the normal manner, outside of the special housing. It is not necessary to provide special slots for receiving the hooks 101 and latches 103, because the top of the camera is normally provided with slots for receiving the side wings of the rear wall of the focusing hood when the same is collapsed or folded down to its flat condition. The removal of the rear wall of the hood makes these slots accessible for receiving the hooks 101 and latches 103, without further alteration.

To mount the camera in the special watertight housing, the front wall 111 of the focusing hood is erected to its upstanding position, and the camera is moved upwardly beneath the upper housing section 21, until the top edge of the front wall 111 of the hood is above the forward end of the roof prism 85, whereupon the front wall of the focusing hood is swung slightly rearwardly so that it will lie in an inclined position between the roof prism and the top wall of the housing section, as seen in Fig. 3. It is then an easy matter to manipulate the camera so that the hooks 101 extend into the slots near the forward corners of the focusing screen, and the camera is moved slightly rearwardly to catch the camera parts on the hooks 101. Then the rear corners of the camera are caught onto the spring latches 103, and the camera is thus anchored securely in place, supported from the housing section 21.

The lower housing section 23 is provided in its front wall with a large window, preferably of circular shape, closed in watertight manner by a transparent plate 113 of plane glass, seated on a watertight gasket and held in position by a retaining ring 115 screwed onto a flange surrounding the window and projecting forwardly from the front wall of the housing section 23. This window 113 is large enough to extend over the field of view of both the upper and lower lenses 63 and 61 of the camera, without obstructing or cutting down the view of either lens. Light entering the finder lens through the window 113 enters the finder chamber and is reflected in normal or usual manner by the mirror 71 onto the focusing screen 73. The image on this screen 73 is seen by light rays extending upwardly from the focusing screen to the upper roof surface of the roof prism, being reflected downwardly again to the lower surface of the prism, thence rearwardly as indicated diagrammatically by the dot dash line, and out through the plane rear surface (somewhat inclined, as shown) of the prism and through the plano-convex lens 93 which constitutes the eye piece for viewing the image on the focusing screen, the lens giving a clear, sharp, and somewhat enlarged view of the finder image.

One advantage of making the supplementary housing in this way and in mounting the camera in suspended position from the top section of the housing, is that the camera does not have to be removed entirely from the housing when it is desired to change film in the camera. In the "Rolleiflex" camera, the film spools 67 and 69 are accessible upon opening a camera back member 121 which is hinged at the top of the back wall of the camera and which is L-shaped so that it extends, when in closed position, down the back wall and along the bottom of the camera, being normally held by a latch near the bottom front corner of the camera. As well seen in Fig. 4, when the lower housing section 23 is removed, there is sufficient space to swing the camera back 121 to an open position adequate for changing the film spools, without removing the camera from the upper housing section 21.

In the above mentioned camera, as manufactured currently and for several years past, the shutter speed and the diaphragm aperture are adjusted by means of adjusting knobs placed on the movable focusing front 75 of the camera, at an elevation between the two lenses, and laterally spaced on opposite sides of the vertical center line of the camera. These adjusting knobs are of frusto-conical shape, and have serrations or teeth formed on the inclined edges of the knobs.

In the embodiment of the invention illustrated in Figs. 3 and 4, these speed and aperture adjusting knobs on the camera are turned by a pair of adjusting knobs 131 mounted side by side on the top of the upper housing section 21, near the front thereof. In the side views, Figs. 3 and 4, the right hand one of these two knobs 131 is directly in line with the left hand one, so that only one knob shows. These knobs are omitted from Fig. 1 for the sake of increased clarity of other parts.

In the camera of the kind above mentioned, both the upper and lower lenses are provided with bayonet mounts on which various accessories may be mounted. In the present instance, the bayonet mount of the upper or finder lens is utilized for mounting the mechanism which connects the external adjusting knobs 131 on the housing with the speed and aperture adjusting knobs on the front of the camera. The details of such connections are not important for present purposes. It is sufficient to say that these connections include a bevel gear 151 at the lower end of a short shaft 153 journaled in ears mounted on and supported by a member which is mounted on the above mentioned bayonet mount of the finder lens. This vertical shaft 153 is connected through a universal joint 155 on the lower end of a longitudinally telescopic shaft 157, the upper end of which is connected through a similar universal joint 159 (Fig. 3) to the adjusting knob 131.

This same construction is duplicated at opposite sides of the center line of the camera, so that one set of these parts serves to connect the right hand external knob 131 with the right hand adjusting knob on the camera front, while the other set of parts serves to connect the left hand external knob 131 with the left hand adjusting knob on the camera front. By means of this mechanism, both the shutter speed and the diaphragm aperture may be easily adjusted from time to time, from the outside of the waterproof protective housing. Because of the provision of the universal joints and the slight telescoping which is allowed in the shaft 157, this adjusting mechanism does not interfere with the forward and back movements of the camera front 75 when the camera is being focused.

All of the various shafts extending through the walls of the housing, for operating parts inside, are equipped with suitable watertight seals, gaskets, or packing, the exact details of which may be varied, as desired.

Even though the protective housing of the present invention is provided with means for viewing the focusing image on the screen, it is nevertheless desirable to equip the housing also with a direct view finder which may be used, for example, under unfavorable lighting conditions. Such a direct view finder is illustrated in Figs. 1 and 3. The front member of the direct view finder is formed by a rectangular frame indicated in general at 261, having resilient side arms 263 which extend downwardly below the bottom cross member of the frame and which are provided with lateral pins 265 extending toward each other and received in a lateral bore 267 formed in the upper housing section 21. Thus it is very easy to remove the viewing frame from the housing by springing the arms 263 away from each other far enough to release the pins 265 from the bores 267, and the frame may be quickly installed on the housing by a reverse operation.

The front viewing frame 261 is held in erect position on the housing by side arms or struts 271 which extend rearwardly from intermediate points of each side member of the frame, to intermediate points of the side members of a rear rectangular frame 273 mounted on a pair of pins 275 extending vertically and having their lower ends threaded into tapped openings or bores 277 on the top of the housing section 21 near its rear end. Pivot pins 281 connect the struts 271 at their forward ends to the frame 261, and the rear ends of the struts are connected by pivot pins 283 to the rear frame 273. The rear frame is movable vertically to a limited extent on its supporting end guiding pins 275, for purposes of adjustment to correlate the field of view through this direct view finder with the actual field of view of the camera, and it may be retained in position, when once adjusted, by any suitable clamping means.

The trunnions 33 of the clamping bail or stirrup may be provided with hanger links 291 having holes for attachment to a neck strap or other suitable carrying device, as shown in Fig. 1. Referring also to Fig. 1, the side arm 31 of the clamping bail may be provided with a convenient hand grip or handle 293, and also may carry a conspicuous index mark 295 for cooperation with graduations on the knob 223.

It is seen from the foregoing disclosure that the above-mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The combination of a photographic camera of the twin lens reflex type, including a main camera body having a focusing screen arranged approximately horizontally substantially at the top of the camera body, a protective watertight housing completely surrounding said camera body to enable use of the camera in underwater photography, said housing having a view finder observation window mounted near the upper rear part of the housing above said focusing screen, and means separable from the camera body and mounted within said housing for deflecting light rays so that light rays from an image on said focusing screen of the camera will be directed toward said finder observation window.

2. A construction as defined in claim 1, wherein said means for deflecting light rays is a prism of the roof type, permanently mounted within said housing in front of said observation window and in a position to overlie said focusing screen of said camera body when the camera body is normally mounted within said housing.

3. A construction as defined in claim 2 in which said observation window of said housing includes an enlarging lens.

4. A construction as defined in claim 2 further including means adjacent said prism for holding said camera body within said housing.

5. A construction as defined in claim 4 in which said means for holding said camera includes a metal frame for mounting said prism and having downwardly extending hooks and latches for extending into and engaging with slots in said camera body in the vicinity of the focusing screen thereof.

6. The combination of a photographic camera of the twin lens type, including a main camera body having a focusing screen arranged approximately horizontally substantially at the top of the camera body, a protective watertight housing completely surrounding said camera body to enable use of the camera in underwater photography, said housing having a view finder observation window mounted near the upper rear part of the housing above said focusing screen, and means separable from the camera body and mounted within said housing for deflecting light rays so that light rays from an image on said focusing screen of the camera will be directed toward said finder observation window, said camera having an optical axis, said observation window being at an oblique angle both to said optical axis and to said focusing screen and being so arranged that said image on said screen will be visible from a location above and behind said housing upon looking in an oblique downward and forward direction.

References Cited in the file of this patent

UNITED STATES PATENTS

| | | |
|---|---|---|
| 1,149,678 | Parker | Aug. 10, 1915 |
| 1,810,302 | Stiles | June 16, 1931 |
| 1,980,546 | Petit et al. | Nov. 13, 1934 |
| 2,132,549 | Wenstrom | Oct. 11, 1938 |
| 2,149,217 | Heinisch et al. | Feb. 28, 1939 |
| 2,176,865 | Floyd | Oct. 17, 1939 |
| 2,297,428 | Nuchterlein | Sept. 29, 1942 |
| 2,390,932 | Fitz | Dec. 11, 1945 |
| 2,431,825 | Pollock | Dec. 2, 1947 |
| 2,464,067 | Barker | Mar. 8, 1949 |
| 2,487,868 | Grigsby | Nov. 15, 1949 |
| 2,506,764 | Bach | May 9, 1950 |
| 2,573,885 | Whitman et al. | Nov. 6, 1951 |
| 2,622,497 | Cornut | Dec. 23, 1952 |

FOREIGN PATENTS

| | | |
|---|---|---|
| 918,183 | France | Oct. 7, 1946 |
| 433,686 | Italy | Apr. 13, 1948 |
| 986,641 | France | Apr. 4, 1951 |
| 1,019,148 | France | Oct. 22, 1952 |